US010054080B2

(12) United States Patent
Senofonte et al.

(10) Patent No.: US 10,054,080 B2
(45) Date of Patent: Aug. 21, 2018

(54) COIL SPRING HANGER FOR EXHAUST DUCT LINER

(71) Applicant: United Technologies Corporation, Hartford, CT (US)

(72) Inventors: Paul R. Senofonte, Jupiter, FL (US); Timothy J. McAlice, Jupiter, FL (US)

(73) Assignee: United Technologies Corporation, Farmington, CT (US)

( * ) Notice: Subject to any disclaimer, the term of this patent is extended or adjusted under 35 U.S.C. 154(b) by 671 days.

(21) Appl. No.: 13/656,888

(22) Filed: Oct. 22, 2012

(65) Prior Publication Data

US 2014/0109593 A1 Apr. 24, 2014

(51) Int. Cl.
*F02K 1/80* (2006.01)
*F02K 1/82* (2006.01)

(52) U.S. Cl.
CPC .......... *F02K 1/822* (2013.01); *F05D 2250/25* (2013.01); *F05D 2260/30* (2013.01); *Y02T 50/675* (2013.01); *Y10T 29/49234* (2015.01)

(58) Field of Classification Search
CPC ... F01K 1/80; F01K 1/805; F02C 7/20; F05D 2250/25; F05D 2260/30; F23R 3/60; F02K 1/78; F02K 1/80; F02K 1/805; F02K 1/82; F02K 1/822; F16F 1/222; F16F 1/126
USPC .......... 60/766, 761, 796, 797, 800; 138/114; 248/60; 278/178, 189
See application file for complete search history.

(56) References Cited

U.S. PATENT DOCUMENTS

| | | | | |
|---|---|---|---|---|
| 2,795,108 A * | 6/1957 | Saldin | ............................. | 60/796 |
| 3,007,312 A * | 11/1961 | Shutts | ......................... | 60/39.821 |
| 3,102,706 A * | 9/1963 | Goldsmith | ..................... | 248/542 |
| 3,121,995 A * | 2/1964 | Albani | ............................. | 60/761 |
| 3,606,704 A * | 9/1971 | Denton | ......................... | 52/167.8 |
| 3,826,088 A | 7/1974 | Nash et al. | | |
| 3,866,417 A * | 2/1975 | Velegol | ............................ | 60/766 |
| 4,526,508 A * | 7/1985 | Antonellis | .............. | F01D 5/066 |
| | | | | 415/173.7 |
| 4,848,089 A * | 7/1989 | Cramer | ............................ | 60/752 |
| 4,864,818 A | 9/1989 | Taylor | | |
| 4,920,742 A * | 5/1990 | Nash et al. | ...................... | 60/799 |
| 4,971,005 A * | 11/1990 | Dyer | ............................ | F02C 9/26 |
| | | | | 123/381 |
| 5,059,055 A | 10/1991 | DeGress et al. | | |
| 5,333,443 A * | 8/1994 | Halila | ............................ | 60/796 |
| 5,592,814 A * | 1/1997 | Palusis et al. | ................... | 60/770 |
| 6,102,610 A * | 8/2000 | Palusis et al. | ................. | 403/388 |
| 6,199,371 B1 * | 3/2001 | Brewer et al. | ................... | 60/766 |
| 7,017,334 B2 | 3/2006 | Mayer et al. | | |
| 7,089,748 B2 | 8/2006 | Tiemann | | |
| 7,581,399 B2 | 9/2009 | Farah et al. | | |

(Continued)

FOREIGN PATENT DOCUMENTS

GB 906123 A * 9/1962 ............. F16F 1/122

*Primary Examiner* — William H Rodriguez
*Assistant Examiner* — Jason H Duger
(74) *Attorney, Agent, or Firm* — Carlson, Gaskey & Olds, P.C.

(57) ABSTRACT

A hanger assembly for use between a first duct and a second duct having an opening therein includes a spring having a first end and a second end, a first mount for attaching the first end to the first duct, a second mount for attaching the second end to the second duct, the second mount having an area greater than the opening, and a central aperture therethrough.

23 Claims, 3 Drawing Sheets

(56) References Cited

U.S. PATENT DOCUMENTS

| | | |
|---|---|---|
| 7,614,236 B2 * | 11/2009 | Mandet et al. ............... 60/766 |
| 7,861,535 B2 | 1/2011 | Figueroa |
| 7,975,488 B2 | 7/2011 | Farah et al. |
| 8,104,290 B2 * | 1/2012 | Ellis et al. ................. 60/796 |
| 8,171,719 B2 * | 5/2012 | Ryan ......................... 60/39.821 |
| 8,240,045 B2 * | 8/2012 | Sutcu et al. ............... 29/889.22 |
| 2008/0022689 A1 | 1/2008 | Farah et al. |
| 2008/0050220 A1 * | 2/2008 | Merry ................. F01D 17/162 |
| | | 415/160 |
| 2008/0158527 A1 | 7/2008 | Farah et al. |
| 2008/0236136 A1 * | 10/2008 | Loffredo ..................... 60/201 |
| 2009/0293498 A1 | 12/2009 | Petty et al. |
| 2009/0317175 A1 * | 12/2009 | Martinez ..................... 403/24 |
| 2012/0186269 A1 * | 7/2012 | Cihlar et al. ................. 60/796 |
| 2012/0247250 A1 * | 10/2012 | Karafillis ............ F16H 57/0427 |
| | | 74/467 |
| 2014/0109592 A1 * | 4/2014 | Senofonte .................... 60/796 |
| 2014/0123678 A1 * | 5/2014 | Preston, III ................. 60/800 |
| 2014/0225380 A1 * | 8/2014 | Gonidec ..................... 292/129 |

* cited by examiner

COIL SPRING HANGER FOR EXHAUST DUCT LINER

BACKGROUND OF THE INVENTION

A gas turbine engine typically includes a fan section, a compressor section, a combustor section, a turbine section, and in some configurations an augmenter section. A liner extending aft of the turbine section typically referred to as an exhaust or augmenter liner includes an inner liner exposed to hot exhaust gases. The inner liner is typically spaced from an outer structure with a plurality of hanger assemblies. The hanger assemblies are required to accommodate misalignment, complex shapes, large thermal growth differentials, significant pressure loads and high temperatures. Moreover, the hangers are positioned within a confined physical envelope that is difficult to access while accommodating relative movement within several planes simultaneously.

Accordingly, it is desirable to design and develop a reduced cost hanger that performs as desired in the harsh environment of the exhaust duct while also simplifying assembly and reducing cost.

SUMMARY OF THE INVENTION

According to an embodiment disclosed herein, a hanger assembly for use between a first duct and a second duct includes a spring having a first end and a second end, a first mount for attaching the first end to the first duct, a second mount for attaching the second end to the second duct, the second mount having an area greater than the opening, and a central aperture therethrough.

According to any previous embodiment described herein, the spring is a coil spring.

According to any previous embodiment described herein, the first mount includes a plate fixedly attached to the first end.

According to any previous embodiment described herein, the plate has an orifice for cooperating with a stud extending radially outwardly from the first duct.

According to any previous embodiment described herein, a diameter of the plate is less than a diameter of the opening.

According to any previous embodiment described herein, a cover is disposed over the second mount the cover having an area greater than an area of the central aperture such that the cover forms a seal over the second mount.

According to any previous embodiment described herein, the second mount is a plate fixedly attached to the second end.

According to any previous embodiment described herein, the plate is for mounting outside of the second duct.

According to any previous embodiment described herein, the first mount is a first plate fixedly attaching to the first end, the second mount is a second plate attaching to the second end of the spring and the spring is a coil spring.

According to a further embodiment disclosed herein, a gas turbine engine includes a fan section including a plurality of fan blades rotatable about an axis; a compressor section in communication with the fan section; a combustor in fluid communication with the compressor section; a turbine section in fluid communication with the combustor and driving the fan section and the compressor section; and an exhaust liner aft of the turbine section, the exhaust liner including a liner defining an inner surface exposed to exhaust gases, a duct having an opening spaced radially outward of the liner; and a hanger assembly supporting the liner relative to the duct, the hanger assembly including: a spring having a first end and a second end, a first mount attaching the first end to the liner, a second mount attaching the second end to the duct, the second mount having an area greater than the opening, and a central aperture therethrough.

According to any previous embodiment described herein, the first mount includes a plate fixedly attached to the first end and a diameter of the plate is less than a diameter of the opening, the plate being inserted through the opening.

According to any previous embodiment described herein, the second mount is a plate fixedly attached to the second end.

According to any previous embodiment described herein, the plate is mounted radially outside of the duct.

According to a still further embodiment disclosed herein, a method of supporting a liner of a gas turbine engine includes the steps of providing a liner and a duct having an opening therein, such that the liner is within the duct, providing a spring having a first end and a second end, a first mount attaching the first end to the liner, and a second mount attaching the second end to the duct, the second mount having an area greater than the opening, and a central aperture therethrough, inserting the first end and the first mount through the central opening.

According to any previous embodiment described herein, the method includes the further step of attaching the first mount to the liner.

According to any previous embodiment described herein, the method includes the further step of attaching the second mount to a radially outwardly disposed side of the duct such that a seal is created between the second mount and the duct.

According to any previous embodiment described herein, the method includes the further step of covering the central aperture such that that a seal is created between said cover and said second mount.

According to any previous embodiment described herein, the method includes the further step of attaching the first mount to the liner through the central aperture in the second mount.

According to any previous embodiment described herein, the method includes the further step of rotating the cover and the lock member to lock the leg between the lock member and the first duct.

These and other features of this application will be best understood from the following specification and drawings, the following of which is a brief description.

DETAILED DESCRIPTION

Figure 1:
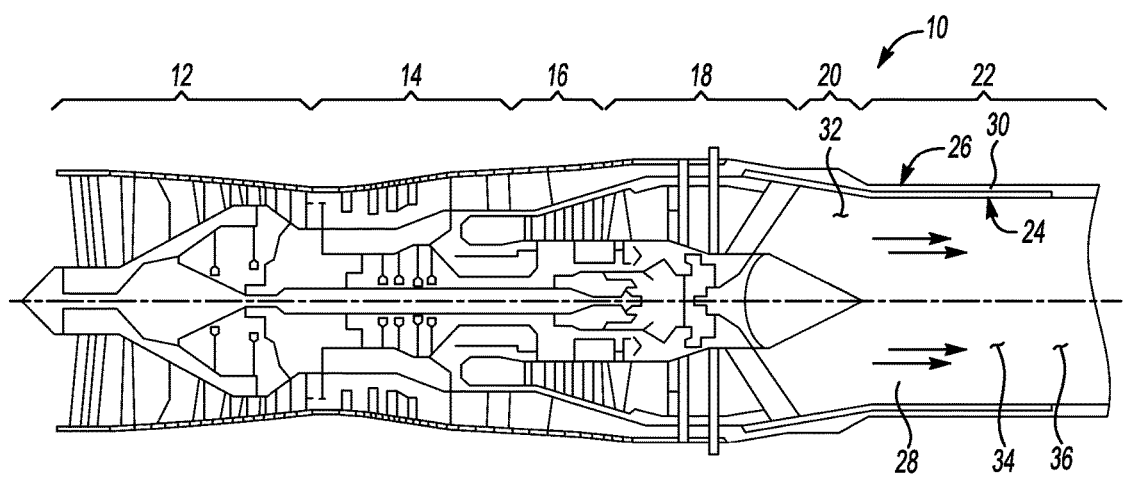
FIG. 1 shows a sectional view of a gas turbine engine incorporating an embodiment of a spring hanger shown herein.

Referring to FIG. 1, a gas turbine engine 10 includes a fan section 12, a compressor section 14, a combustor section 16, and a turbine section 18. Air entering into the fan section 12 is initially compressed and fed to the compressor section 14.

In the compressor section 14, the incoming air from the fan section 12 is further compressed and communicated to the combustor section 16. In the combustor section 16, the compressed air is mixed with gas and ignited to generate a hot exhaust stream 28. The hot exhaust stream 28 is expanded through the turbine section 18 to drive the fan section 12 and the compressor section 14. In this example, the gas turbine engine 10 includes an augmenter section 20 where additional fuel can be mixed with the exhaust gasses 28 and ignited to generate additional thrust. The exhaust gasses 28 flow from the turbine section 18 and the augmenter section 20 through an exhaust liner assembly 22.

The example exhaust liner assembly 22 includes a liner 24 that defines an inner surface exposed to the hot exhaust gasses 28. The liner 24 (e.g., a first duct) is supported by a duct 26 (e.g., a second duct) disposed radially outward of the liner 24. An annular space 30 is disposed between the liner 24 and the duct 26 for a cooling airflow. The example exhaust liner assembly 22 includes a first section 32, a second section 34, and third section 36. Each of the first, second and third sections 32, 34, 36 are movable relative to each other to provide a thrust vectoring function. As appreciated, although the gas turbine engine 10 is disclosed and described by way of example and other configurations and architectures of gas turbine engines are within the contemplation of this disclosure and would benefit from the disclosures within this application.

Figure 2:
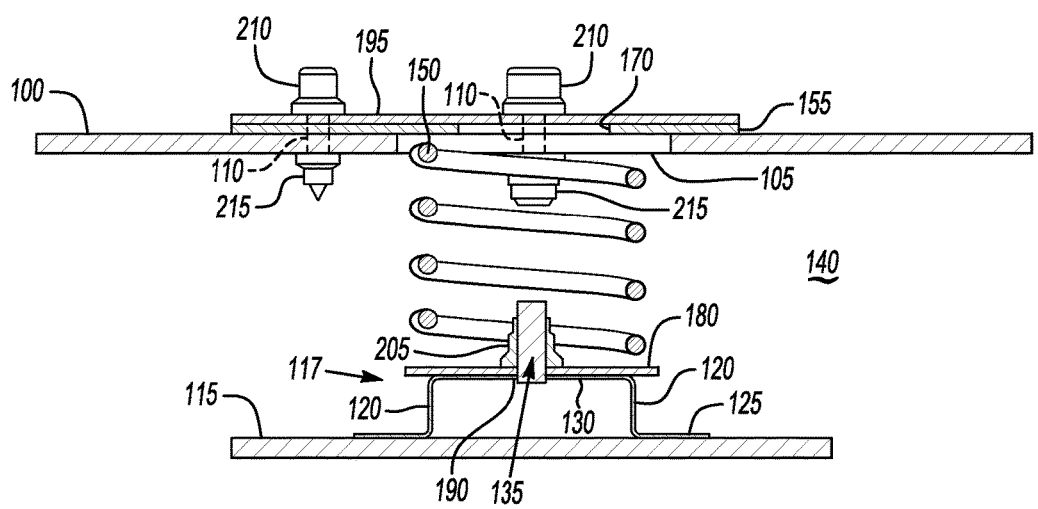
FIG. 2 is a side view partially in section proportion of the engine of FIG. 1.
Figure 3:
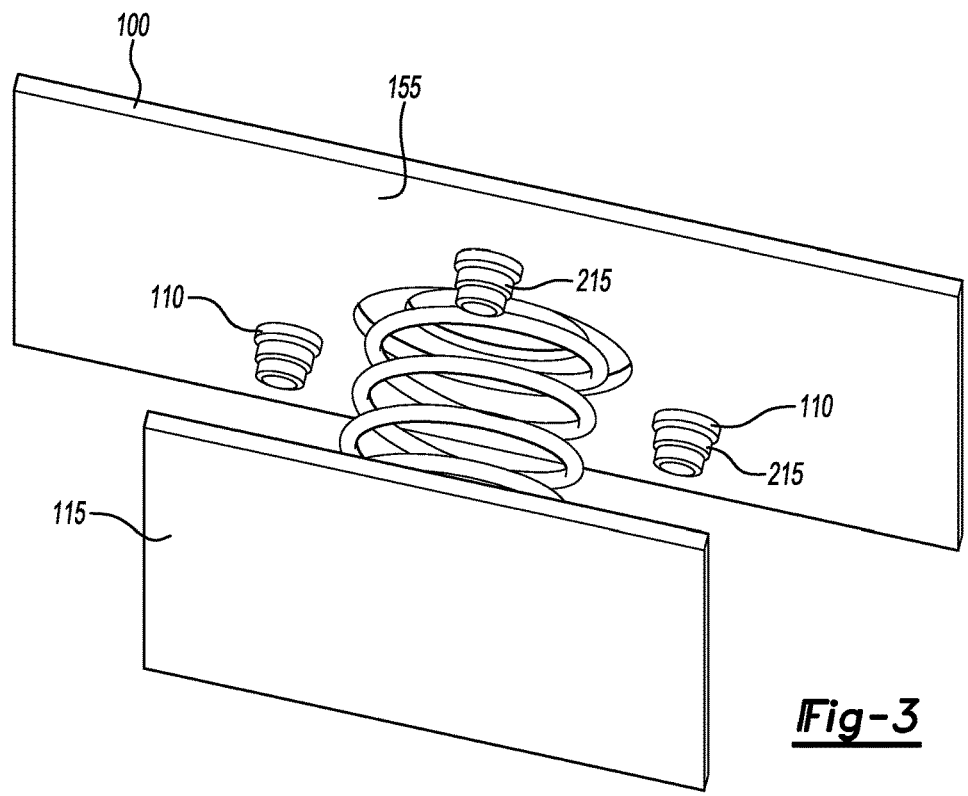
FIG. 3 is a sectional view in perspective of the hanger of FIG. 2.

Referring now to FIGS. 2 and 3, casing/duct 26/100 is shown having a major opening 105 and a plurality of attachment holes 110. Though three attachment holes 110 are shown herein, another number of attachment holes 110 may be used.

Figure 5:
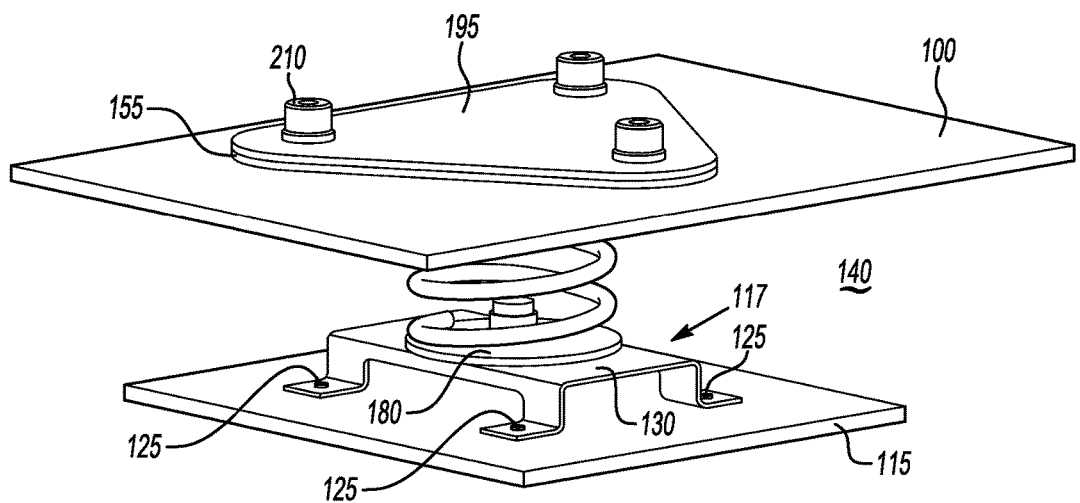
FIG. 5 is a perspective view partially in section of the hanger assembly of FIGS. 2 and 3.

A liner 24/115 is placed coaxially within the casing 26/100 the liner 24/115 has a bracket 117 attached thereto (see also FIG. 5). The bracket 117 has a plurality of L-shaped legs 120 that are riveted or the like through apertures 125 into liner 115.

The bracket 117 has a body 130 that is generally flat and has a stud 135 extending radially outwardly and perpendicularly from the body 130. The casing 100 and the liner 115 form a volume 140 therebetween through which cooling air flows.

Figure 4:
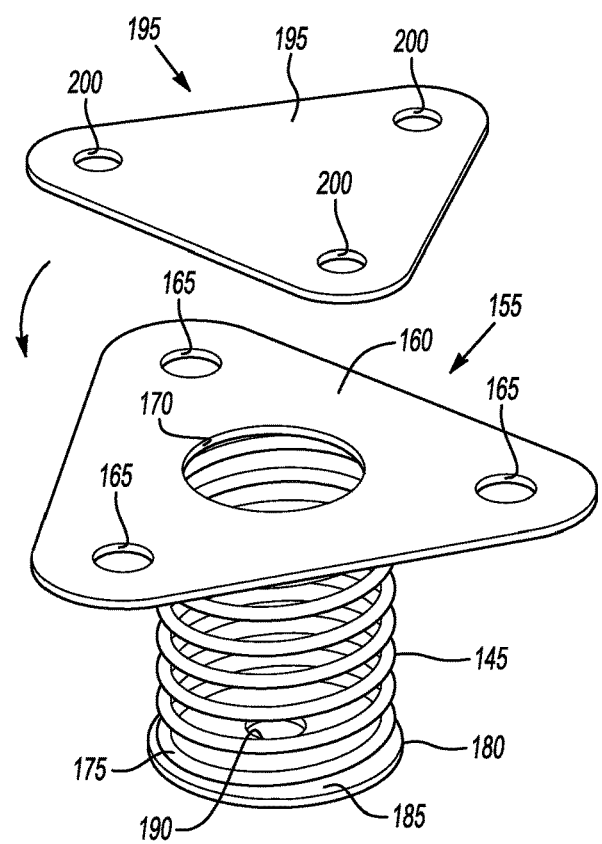
FIG. 4 is a view of the hanger assembly of FIGS. 2 and 3.

Referring now to FIGS. 2 and 4, coil spring 145 has a first end 150 that is attached to a casing plate 155 by welding or the like. The casing plate 155 has a body 160 that is show herein as triangularly shaped though other shapes may be appropriate. Casing plate 155 has a plurality of attachment holes 165 that align with the attachment holes 110 in the casing as will be discussed herein. The casing plate 155 has an orifice 170 that is located in a center area of the casing of the body 160 to allow access to the stud 135 and the bracket 117 as will be discussed herein.

The coil spring has a second end 175 attached to a bracket plate 180 by welding or the like. The bracket plate 180 has a circular shape 185 and a passageway 190 through which the stud 135 may protrude. A cover 195 has a shape that mimics the shape of the casing plate body 160 to minimize the number of attachment bolts required. The cover 195 has a plurality of attachment holes 200 that align with the attachment holes 110 in the casing 100 and the attachment holes 165 in the casing plate 155. The major opening 105 in the casing 100 has a greater diameter than the largest dimension the bracket plate 180 to enable the insertion of the back bracket plate 180 and the coil spring 145 through the major opening 105. The casing plate 155 has a greater area than the major opening 105 so that the casing plate may create a seal over the casing 100. Similarly, the cover 195 has a greater area than orifice 170 so that the cover may create a seal over the cover plate 155.

To assemble the apparatus, the bracket(s) 117 is riveted or the like to the liner 115 and the liner 115 is inserted into the casing so that the body 130 is in approximate registration with major opening 105. Registration may not be perfect because of manufacturing and part tolerances. The bracket plate 180 and the coil spring 145 are inserted through the major opening 105 until the bracket plate is in contact with the bracket 117 and the stud 135 extends radially outwardly through the passageway 190 in the bracket plate 180. Nut 205 is inserted through the orifice 170 of the coil spring 145, which acts as a hanger, and screwed lightly onto the stud 135. The casing plate 155 is then rotated until the attachment holes 165 are in register with the attachment holes 110 in the casing 100. The nut 205 is then torqued onto the stud 135.

The cover 195 is then placed over the casing plate 155. When the attachment holes 200 in the cover are in alignment with the attachment holes 165 in the casing plate 155 and the attachment holes 110 and the casing, a bolt 210 is then inserted through each set of holes 110, 165, 200 and secured thereto by nuts 215.

By placing the cover 195 over the casing plate 155, any air leaking through the orifice 170 is minimized. Because the casing plate is greater in area than the major opening, 105 leakage through the major opening 105 is minimized by the casing plate 155 and the cover 195. Any appropriate sealing material such as silicone may be placed between the cover 195 and the casing plate 155, and the between the casing plate 155 and the casing 100.

By utilizing a coil spring liner hanger assembly, build tolerances are accommodated in all directions, there is a minimal part count compared to other systems, there are no moving parts relative to each other, there is minimal leakage of air through the volume 140, thermal movement the liner 115 and the casing 100 is accommodated all directions, the hanger assembly acts in tension and compression, the coil spring 145 can be adapted for required loads in terms of hardness and flexibility, and no shimming or rigging is required during assembly.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A hanger assembly for a gas turbine engine:
   a spring having a first end attached to a first duct and a second end attached to a second duct having an opening therein, and said spring defining a central axis,
   a first mount fixed directly to said first end of said spring, said first mount comprising a bracket directly connected to said first duct,
   a second mount fixed directly to said second end of said spring, said second mount directly connected to said second duct, said second mount having an area greater than said opening, and a central aperture therethrough, and
   wherein said spring directly connects said first and second ducts together such that said first and second ducts are moveable relative to each other in a first direction along said central axis and are moveable relative to each other in a second direction transverse to said central axis,
   wherein the first duct is an exhaust liner of the gas turbine engine spaced radially inward of the second duct and the second mount comprises a plate fixed directly to a radially outward facing surface of the second duct.

2. The hanger assembly as recited in claim 1, wherein said spring is a coil spring with said second end extending through said opening in said second duct and with said first end fixed to said bracket at a location between said first and second ducts.

3. The hanger assembly as recited in claim 1, wherein said bracket includes at least a first plate fixedly attached to said first end and a bracket body directly connecting said first plate to said first duct.

4. The hanger assembly as recited in claim 3, wherein said first plate has an orifice surrounded by said first end of said spring and, wherein said bracket body includes a flat portion in direct abutting engagement with said first plate, said flat portion including a stud extending radially away from said first duct and through said orifice.

5. The hanger assembly as recited in claim 4, wherein a diameter of said first plate is less than a diameter of said opening of said second duct, and wherein said bracket body includes a plurality of legs that extend from said flat portion to attach to said first duct such that said flat portion and first plate are axially spaced from said first duct in a direction along said central axis.

6. The hanger assembly as recited in claim 1, wherein said plate includes said central aperture, wherein said central aperture is aligned with said opening in said second duct, and the second mount further comprising a cover disposed directly over said plate, said cover having an area greater than an area of said central aperture such that said cover forms a seal over said second mount and completely covers said central aperture and said opening.

7. The hanger assembly as recited in claim 6, wherein said second end of said spring extends through said opening and is fixedly attached to a radially inner surface of said plate to surround said central aperture.

8. The hanger assembly as recited in claim 7, wherein said plate includes one or more mounting holes that align with corresponding mounting holes in said cover and said second duct such that the plate is directly clamped between said cover and said second duct.

9. The hanger assembly as recited in claim 1, wherein said bracket is a first plate attached to a bracket body with at least one first fastener, said first plate fixedly attached to said first end of said spring and said first duct, and wherein said plate of said second mount is directly attached to said second duct with at least one second fastener that is non-coaxial with said first fastener, said plate of said second mount fixedly attached to said second end of said spring, and wherein said spring is a coil spring.

10. The hanger assembly as recited in claim 1, wherein said first and second ducts are configured to surround an engine axis that is transverse to said central axis, and wherein said second direction is along said engine axis, and wherein said second end of said spring extends through said opening in said second duct such that said spring extends across a gap formed between the first and second ducts.

11. The hanger assembly as recited in claim 1, wherein said bracket comprises a bracket plate attached to a bracket body that is attachable to said first duct, said bracket plate being attached to said bracket body via a first attachment interface and said second mount is attachable to said second duct via a second attachment interface that is non-coaxial with said first attachment interface.

12. The hanger assembly as recited in claim 11, wherein said first attachment interface comprises a first fastener and said second attachment interface comprises a second fastener that is separate from and independently attachable of said first fastener.

13. The hanger assembly as recited in claim 12, wherein said second fastener is located radially outwardly relative to said first fastener.

14. The hanger assembly as recited in claim 13, wherein said first fastener comprises a single fastener that is concentric with said central axis, and wherein said second fastener comprises a plurality of second fasteners that are non-concentric with said central axis.

15. A gas turbine engine comprising:
a fan section including a plurality of fan blades rotatable about an engine axis;
a compressor section in communication with the fan section;
a combustor in fluid communication with the compressor section;
a turbine section in fluid communication with the combustor and driving the fan section and the compressor section; and
an exhaust liner aft or the turbine section, the exhaust liner including a liner defining an inner surface exposed to exhaust gases, a duct having an opening spaced radially outward of the liner; and a hanger assembly supporting the liner relative to the duct, the hanger assembly including:
a spring having a first end and a second end, and said spring defining a central axis,
a first mount comprising a bracket fixed directly to said first end of said spring and directly connected to said liner,
a second mount fixed directly to said second end of said spring and comprising a plate fixed directly to a radially outward facing surface of said duct, said second mount having an area greater than said opening, and a central aperture therethrough, and
wherein said spring directly connects said liner and said duct together such that said liner and said duct are moveable relative to each other in a first direction along said central axis and are moveable relative to each other in a second direction transverse to said central axis.

16. The gas turbine engine as recited in claim 15, wherein said bracket includes at least a first plate fixedly attached to said first end of said spring and a bracket body directly connecting said first plate to said liner, and wherein a diameter of said first plate is less than a diameter of said opening, said first plate being capable of being inserted through said opening and attached to said liner via said bracket body during assembly.

17. The gas turbine engine as recited in claim 16, wherein said plate of said second mount has the area greater than said opening and said central aperture therethrough.

18. The gas turbine engine as recited in claim 17, wherein said plate of said second mount is mounted radially outside of said duct, and said second mount including a cover disposed directly over said plate of said second mount, said cover having an area greater than an area of said central aperture such that said cover forms a seal over said second mount and completely covers said central aperture and said opening.

19. The gas turbine engine as recited in claim 15, wherein said engine axis is transverse to said central axis, and wherein said second direction is along said engine axis, and wherein said second end of said spring extends through said opening in said duct such that said spring extends across a gap formed between the liner and the duct.

20. The gas turbine engine as recited in claim 15, wherein said bracket comprises a bracket plate attached to a bracket body that is attached to said liner, said bracket plate being attached to said bracket body via a first attachment interface, and said second mount is attached to said duct via a second attachment interface that is non-coaxial with said first attachment interface.

21. The gas turbine engine as recited in claim 20, wherein said first attachment interface comprises a first fastener and said second attachment interfaces comprises at least one second fastener that is separate from and independently attachable of said first fastener.

22. The gas turbine engine as recited in claim 21, wherein said at least one second fastener is located radially outwardly relative to said first fastener.

23. The gas turbine engine as recited in claim 22, wherein said first fastener comprises a single fastener that is concentric with said central axis, and wherein said at least one second fastener comprises a plurality of second fasteners that are non-concentric with said central axis.

\* \* \* \* \*